(12) United States Patent
Patelczyk et al.

(10) Patent No.: US 9,650,005 B2
(45) Date of Patent: *May 16, 2017

(54) VEHICLE SHIELD

(71) Applicant: Lund, Inc., Buford, GA (US)

(72) Inventors: Jeff Patelczyk, Cumming, GA (US); Mitch Fogle, Jefferson, GA (US); Chris Morin, Lawrenceville, GA (US); Greg Razor, Liburn, GA (US); Robert R. Chapman, Buford, GA (US); Luis Serentill, Lawrenceville, GA (US)

(73) Assignee: Lund, Inc., Buford, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/052,167

(22) Filed: Feb. 24, 2016

(65) Prior Publication Data

US 2016/0280170 A1 Sep. 29, 2016

Related U.S. Application Data

(63) Continuation of application No. 14/182,041, filed on Feb. 17, 2014, now Pat. No. 9,302,639, which is a
(Continued)

(51) Int. Cl.
*B60R 13/04* (2006.01)
*B60R 19/52* (2006.01)
(Continued)

(52) U.S. Cl.
CPC .............. *B60R 19/52* (2013.01); *B60R 13/04* (2013.01); *B60R 19/24* (2013.01); *B60R 19/54* (2013.01);
(Continued)

(58) Field of Classification Search
CPC ....... B62D 25/12; B60R 13/005; B60R 13/04; B60R 19/52; B60R 19/54
(Continued)

(56) References Cited

U.S. PATENT DOCUMENTS

D85,241 S 9/1931 Henderson
2,073,159 A * 3/1937 Lintern .................. B60H 1/248
362/493
(Continued)

FOREIGN PATENT DOCUMENTS

FR 1096819 A 6/1955
FR 1121035 A 7/1956
(Continued)

OTHER PUBLICATIONS

2007 Toyota Camry SE Road Test, Barry Windfield, Mar. 2006, Car and Driver http://www.caranddriver.com/reviews/2007-toyota-camry-se-road-test.

*Primary Examiner* — Gregory Blankenship
(74) *Attorney, Agent, or Firm* — Knobbe Martens Olson and Bear LLP

(57) ABSTRACT

A vehicle shield is provided according to the invention. The vehicle shield is constructed to avoid excessive hood flutter. The shield includes a vehicle shield region and an attachment region. The vehicle shield region is constructed for extending across at least a portion of a vehicle hood for protecting the vehicle hood. The attachment region is constructed for attaching the vehicle shield region to a vehicle. Also provided is a method of installing the shield to a motor vehicle.

14 Claims, 16 Drawing Sheets

Related U.S. Application Data continuation of application No. 13/037,017, filed on Feb. 28, 2011, now Pat. No. 8,651,554.

(60) Provisional application No. 61/339,044, filed on Feb. 26, 2010.

(51) Int. Cl.
*B60R 19/54* (2006.01)
*B62D 35/00* (2006.01)
*B62D 25/12* (2006.01)
*B62D 27/02* (2006.01)
*B60R 19/24* (2006.01)

(52) U.S. Cl.
CPC ............ *B62D 25/12* (2013.01); *B62D 27/026* (2013.01); *B62D 35/005* (2013.01)

(58) Field of Classification Search
USPC ......... 296/91, 191, 180.1, 180.2, 1.07, 1.08, 296/193.11, 187.09, 136.08, 136.07; 293/126–128; D12/86, 163, 167, 169, D12/190, 162, 196
See application file for complete search history.

(56) References Cited

U.S. PATENT DOCUMENTS

| | | | | |
|---|---|---|---|---|
| 2,236,846 A * | 4/1941 | Davisson | ............... | B60J 1/2005 296/91 |
| 2,475,901 A * | 7/1949 | Kipp | ............... | B60J 3/002 296/95.1 |
| D154,735 S | 8/1949 | Airbib | | |
| D154,861 S | 8/1949 | Maher | | |
| D156,679 S | 12/1949 | Stiles | | |
| D157,555 S | 3/1950 | Abrams | | |
| D159,144 S | 6/1950 | Dieterich | | |
| 2,534,763 A * | 12/1950 | Flavin | ............... | B60J 3/002 296/95.1 |
| 2,566,934 A * | 9/1951 | Dieterich | ............... | B60J 3/002 296/95.1 |
| 2,567,501 A * | 9/1951 | Zeis | ............... | B60J 3/002 296/95.1 |
| 2,599,809 A * | 6/1952 | Branch | ............... | B60J 3/002 296/95.1 |
| D167,676 S | 9/1952 | Chicorel | | |
| 2,757,954 A * | 8/1956 | Hurley | ............... | B60J 1/2005 296/91 |
| 2,777,732 A * | 1/1957 | Walsh | ............... | B60J 3/002 296/91 |
| 2,792,254 A * | 5/1957 | Hagglund | ............... | B60J 1/2005 180/68.6 |
| 2,793,705 A * | 5/1957 | Garrity | ............... | B60J 1/20 180/69.2 |
| 3,015,517 A | 1/1962 | Thornburgh | | |
| 3,022,848 A * | 2/1962 | Heiser | ............... | B60J 1/2005 180/69.2 |
| D201,496 S | 6/1965 | Stef | | |
| 3,214,216 A * | 10/1965 | Brown, Jr. | ............... | B60J 11/08 160/370.21 |
| 3,678,635 A * | 7/1972 | Vagi | ............... | B60Q 1/2653 248/27.1 |
| 3,695,674 A * | 10/1972 | Baker | ............... | B62D 35/005 296/180.1 |
| 3,728,537 A * | 4/1973 | Barenyi | ............... | B60Q 1/2611 296/210 |
| 3,785,699 A * | 1/1974 | Molaskey | ............... | B60J 1/2002 296/152 |
| 3,815,700 A * | 6/1974 | Mittendorf | ............... | B60J 1/2005 180/68.6 |
| D239,705 S | 4/1976 | Lund | | |
| 4,018,472 A * | 4/1977 | Mason, Jr. | ............... | B62D 35/001 105/1.2 |
| 4,040,656 A * | 8/1977 | Clenet | ............... | B60J 1/2005 296/91 |
| 4,043,587 A * | 8/1977 | Giallourakis | ............... | B60J 1/2005 296/91 |
| 4,052,099 A * | 10/1977 | Lowery | ............... | B60J 1/2005 248/909 |
| 4,063,773 A * | 12/1977 | Modesette | ............... | B60J 1/2005 296/91 |
| 4,149,749 A * | 4/1979 | Canal | ............... | B60J 3/0204 296/214 |
| 4,153,129 A * | 5/1979 | Redmond | ............... | B60J 1/2005 180/68.6 |
| 4,159,845 A * | 7/1979 | Bratsberg | ............... | B60J 1/2005 296/91 |
| D252,680 S | 8/1979 | Kingsley et al. | | |
| 4,219,870 A * | 8/1980 | Haraden | ............... | F21V 19/0005 362/263 |
| 4,262,954 A * | 4/1981 | Thompson | ............... | B62D 35/005 105/1.2 |
| D261,500 S | 10/1981 | Butler | | |
| 4,320,919 A * | 3/1982 | Butler | ............... | B62D 35/001 296/180.1 |
| D264,833 S | 6/1982 | Trombley et al. | | |
| 4,364,591 A * | 12/1982 | Bien | ............... | B60R 19/445 293/102 |
| 4,412,698 A * | 11/1983 | Kingsley | ............... | B60J 3/002 296/29 |
| D272,429 S | 1/1984 | Trombley et al. | | |
| D273,672 S | 5/1984 | Lund | | |
| 4,471,991 A * | 9/1984 | Matthias | ............... | B60J 1/2005 180/68.6 |
| 4,493,577 A * | 1/1985 | Cosenza | ............... | F16B 9/00 29/525.02 |
| D283,120 S | 3/1986 | Trombley et al. | | |
| D283,611 S | 4/1986 | Kingsley | | |
| D284,565 S | 7/1986 | Trombley et al. | | |
| 4,627,657 A * | 12/1986 | Daniels | ............... | B60J 1/2005 180/68.6 |
| D288,309 S | 2/1987 | Lund | | |
| D288,310 S | 2/1987 | Lund | | |
| D291,295 S | 8/1987 | Lund | | |
| 4,707,014 A * | 11/1987 | Rich | ............... | B60Q 1/05 296/180.1 |
| 4,726,619 A * | 2/1988 | Haugestad | ............... | B60J 3/002 296/95.1 |
| 4,758,040 A * | 7/1988 | Kingsley | ............... | B60J 3/002 296/95.1 |
| 4,776,627 A * | 10/1988 | Hutto | ............... | B60K 11/08 180/68.6 |
| D299,713 S | 2/1989 | Dunham | | |
| 4,819,136 A * | 4/1989 | Ramsey | ............... | B60R 3/002 362/267 |
| D300,918 S * | 5/1989 | Turner | ............... | D12/181 |
| D301,028 S * | 5/1989 | Buck | ............... | D12/191 |
| D301,450 S * | 6/1989 | Kingsley | ............... | D12/191 |
| 4,842,319 A * | 6/1989 | Ziegler | ............... | B60J 1/2005 180/68.6 |
| 4,842,320 A * | 6/1989 | Kingsley | ............... | B60J 3/002 160/DIG. 3 |
| 4,842,912 A * | 6/1989 | Hutter, III | ............... | B29C 65/02 156/247 |
| D304,437 S * | 11/1989 | Eash | ............... | D12/190 |
| D304,819 S * | 11/1989 | Chapman | ............... | D12/181 |
| 4,929,013 A * | 5/1990 | Eke | ............... | B60J 1/20 296/180.5 |
| 4,966,404 A * | 10/1990 | Lund | ............... | B60J 3/002 160/DIG. 3 |
| D312,238 S * | 11/1990 | Lund | ............... | D12/191 |
| D319,209 S * | 8/1991 | Miller | ............... | D12/191 |
| 5,112,095 A * | 5/1992 | Lund | ............... | B62D 35/005 296/180.5 |
| 5,130,906 A * | 7/1992 | Lund | ............... | B60Q 1/302 296/95.1 |
| 5,183,303 A * | 2/1993 | Zoller | ............... | B60R 19/445 29/433 |
| 5,280,386 A * | 1/1994 | Johnson | ............... | B60J 1/2005 296/180.1 |

(56) References Cited

U.S. PATENT DOCUMENTS

| | | | | |
|---|---|---|---|---|
| 5,308,134 | A * | 5/1994 | Stanesic | B60J 1/2005 296/180.1 |
| 5,320,461 | A * | 6/1994 | Stanesic | B60R 11/00 24/289 |
| 5,348,363 | A * | 9/1994 | Fink | B60J 1/2005 180/69.23 |
| D352,491 | S * | 11/1994 | Galasso | D12/190 |
| 5,403,059 | A * | 4/1995 | Turner | B62D 35/005 296/180.1 |
| 5,456,786 | A * | 10/1995 | Cook | B29C 47/003 156/244.11 |
| 5,475,956 | A * | 12/1995 | Agrawal | B29C 35/08 296/201 |
| 5,522,634 | A * | 6/1996 | Stanesic | B60J 3/002 296/95.1 |
| D379,956 | S * | 6/1997 | Baughman | D12/181 |
| 5,636,892 | A * | 6/1997 | Gordon | B60J 1/002 296/152 |
| 5,664,871 | A * | 9/1997 | Thompson | B60Q 1/28 296/95.1 |
| 5,755,483 | A * | 5/1998 | Lund | B62D 35/005 296/91 |
| 5,791,719 | A * | 8/1998 | Alley | B60J 1/2005 24/295 |
| 5,851,044 | A * | 12/1998 | Lund | B60J 3/002 296/152 |
| 5,984,401 | A * | 11/1999 | Hannah | B60J 11/00 248/205.9 |
| 6,027,156 | A * | 2/2000 | Lund | B60J 1/2005 296/91 |
| 6,099,064 | A * | 8/2000 | Lund | B60J 3/002 296/152 |
| 6,099,065 | A * | 8/2000 | Lund | B60J 3/002 296/152 |
| 6,460,914 | B2 * | 10/2002 | Gille | B60R 13/00 293/128 |
| 6,511,109 | B1 * | 1/2003 | Schultz | B60R 19/18 293/102 |
| 6,547,305 | B1 * | 4/2003 | Ellis | B60J 1/2005 296/91 |
| 6,547,306 | B2 * | 4/2003 | Espinose | B62D 35/005 206/494 |
| 6,551,540 | B1 * | 4/2003 | Porter | B29C 45/1635 264/255 |
| 6,752,446 | B2 * | 6/2004 | Espinose | B62D 35/005 296/91 |
| 6,910,316 | B2 * | 6/2005 | Espinose | B62D 35/005 296/91 |
| 7,029,051 | B2 * | 4/2006 | Espinose | B62D 35/005 280/770 |
| 7,036,873 | B2 * | 5/2006 | Pommeret | B60R 19/50 296/191 |
| D533,810 | S * | 12/2006 | Metsugi | D12/92 |
| D533,820 | S * | 12/2006 | Sonoda | D12/169 |
| 7,156,452 | B2 * | 1/2007 | Schumacher | B62D 35/005 296/180.1 |
| D539,710 | S * | 4/2007 | Kouyama | D12/169 |
| 7,232,246 | B2 * | 6/2007 | Kleber | B60Q 1/50 296/191 |
| D564,414 | S * | 3/2008 | Okue | D12/92 |
| D564,425 | S * | 3/2008 | Okue | D12/169 |
| 7,377,564 | B1 * | 5/2008 | Baffy | B60R 3/00 293/117 |
| D586,270 | S * | 2/2009 | Suga | D12/169 |
| 8,651,554 | B1 * | 2/2014 | Patelczyk | B62D 25/12 296/136.08 |
| 9,302,639 | B2 * | 4/2016 | Patelczyk | B62D 25/12 |
| 2002/0079716 | A1 * | 6/2002 | Espinose | B60J 1/20 296/95.1 |
| 2003/0184113 | A1 * | 10/2003 | Espinose | B62D 35/005 296/91 |
| 2004/0189037 | A1 * | 9/2004 | Espinose | B62D 35/005 296/91 |
| 2004/0191475 | A1 * | 9/2004 | Murayama | B29C 45/33 428/137 |
| 2005/0204703 | A1 * | 9/2005 | Espinose | B62D 35/005 53/429 |
| 2008/0311349 | A1 * | 12/2008 | Johnson | C09J 7/0296 428/172 |
| 2010/0007169 | A1 * | 1/2010 | Nguyen | B60J 11/06 296/136.07 |
| 2010/0115851 | A1 * | 5/2010 | Nakao | B60R 13/04 49/502 |
| 2012/0274096 | A1 * | 11/2012 | Ezaka | B29C 65/06 296/180.1 |

FOREIGN PATENT DOCUMENTS

| | | |
|---|---|---|
| GB | 734743 A | 8/1955 |
| GB | 829154 A | 2/1960 |
| JP | 2000296738 A | 10/2000 |
| JP | 2013091427 A | 4/2015 |
| JP | 2013147169 A | 3/2016 |

* cited by examiner

VEHICLE SHIELD

CROSS REFERENCE TO RELATED APPLICATION

This application is a continuation of U.S. application Ser. No. 14/182,041 that was filed with the United States Patent and Trademark Office on Feb. 17, 2014, which is a continuation of U.S. application Ser. No. 13/037,017 that was filed with the United States Patent and Trademark Office on Feb. 28, 2011, now U.S. Pat. No. 8,651,554, and includes the disclosure of U.S. application Ser. No. 61/339,044 that was filed with the United States Patent and Trademark Office on Feb. 26, 2010. A priority right is claimed to U.S. Provisional Application Ser. No. 61/339,044, to the extent appropriate. The completed disclosures of U.S. application Ser. Nos. 61/339,044, 13/037,017, and 14/182,041 are incorporated herein by reference.

TECHNICAL FIELD

This application relates to vehicle shields to protect the front end of a vehicle, such as the leading edge of a hood, or a portion of the front fascia of the vehicle.

BACKGROUND

Numerous types of vehicle shields have been developed to protect a vehicle from contact with road debris, bugs, and to deflect airflow away from windshields. These devices are also commonly referred to as bug shields or airflow deflectors. Such devices are described in U.S. Pat. No. 4,929,013 to Eke, U.S. Pat. No. 5,112,095 to Lund et al., U.S. Pat. No. 5,755,483 to Lund, U.S. Pat. No. 6,027,156 to Lund et al., U.S. Pat. No. 6,752,446 to Espinose et al, U.S. Pat. No. 6,910,316 Espinose et al., and U.S. Pat. No. 7,156,452 to Schumacher et al, each of which are hereby incorporated herein in its entirety. All of the above patents are assigned to Lund Industries, Incorporated, the assignee of this patent application.

Changes in the design and manufacturing of vehicles have raised new issues with respect to the construction of vehicle shields. Because hoods on later model vehicles are generally thinner and lighter, some vehicle shields can cause an excessive amount of hood flutter at high speeds. Additionally, many vehicles are produced in such a manner that traditional hood shields using clips or other fasteners cannot be attached. In some vehicle models where the leading edge of the hood is virtually horizontal, the front fascia of the vehicle needs to be protected instead of the leading edge of the hood. Furthermore, a greater emphasis on fuel economy in vehicle design has led to the need for front end vehicle protection with improved aerodynamics. Improvements are desired.

SUMMARY

A vehicle shield is provided according to the disclosure. The vehicle shield is constructed for extending across at least a portion of a vehicle hood or front fascia for protecting the vehicle's exterior surface. By use of the term "front fascia," it is meant to include the finished front surface of the vehicle surface that surrounds the front bumper and grille. In many instances, the front fascia is in front of the leading edge of the vehicle hood and wraps around the front sides of the vehicle such that it extends well beyond the leading edge width of the hood. The vehicle shield includes a main body and an attachment system for connecting the main body to the vehicle. The main body has an outer periphery defined by a leading edge, a trailing edge, a first side edge and a second side edge. The main body also has a first side comprising a protection surface that extends to the edges and is defined by the outer periphery. The main body has a contour configuration designed to follow or match the contoured surface configuration of a vehicle's hood or front fascia. On the side opposite the protection surface is a second side comprising an attachment surface having a second contoured shape designed to follow the first contour of the protection surface. By the use of the term "contour" it is meant to include surfaces that are not merely planar. By the use of the term "follow," in this context, it is meant that the vehicle shield main body surface(s), excluding the edges, are generally equidistant from the vehicle contoured surface throughout the majority of the vehicle shield. The attachment system can include first, second, third and fourth adhesive tape sections, each of which have a thickness and a tape liner. The first adhesive tape section can be connected to the attachment surface adjacent to or proximate the leading edge of the vehicle shield while the second adhesive tape section can be connected to the attachment surface adjacent to or proximate the trailing edge of the vehicle shield. By the use of the term "proximate" it is meant to delineate that the adhesive tape sections are closer to the outer periphery of the vehicle shield than they are to the central portion of the vehicle shield. Optionally, the leading edge, the trailing edge and the two side edges have a lip and/or are rolled downward towards the attachment side to define an edge depth. The vehicle shield main body can have a substantially uniform material thickness and can be formed from acrylic, ABS plastic, or other suitable materials. Additionally, the main body can also have a chrome film coating, a painted film coating, or can be given a smoke appearance. A method of installing the vehicle shield is also disclosed.

DETAILED DESCRIPTION

Figure 16:
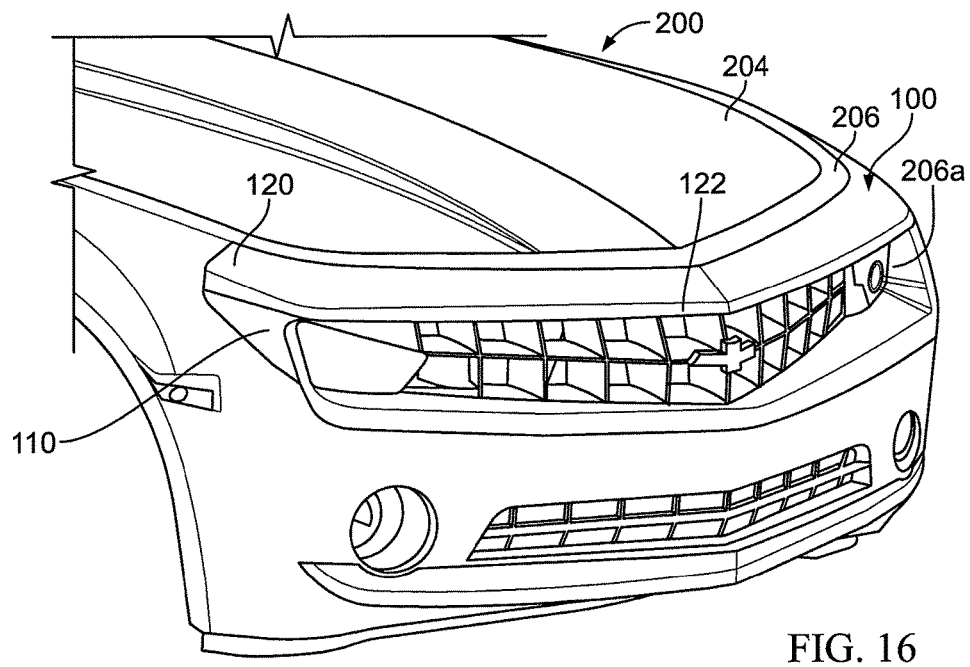
FIG. 16 is a perspective view of a tenth embodiment of a vehicle shield mounted on a vehicle.
Figure 17:
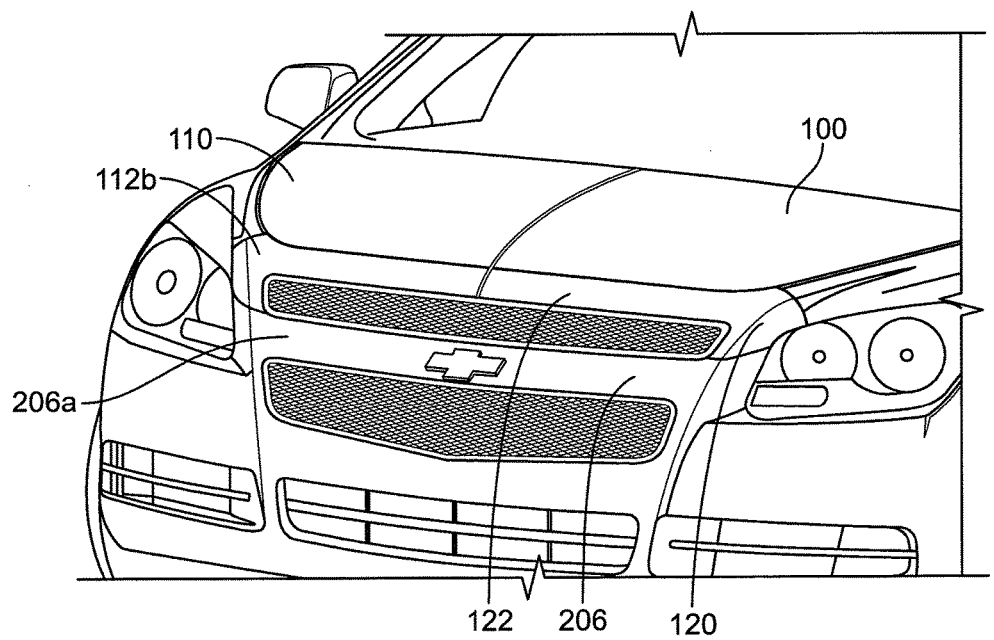
FIG. 17 is a perspective view of an eleventh embodiment of a vehicle shield mounted on a vehicle.
Figure 18:
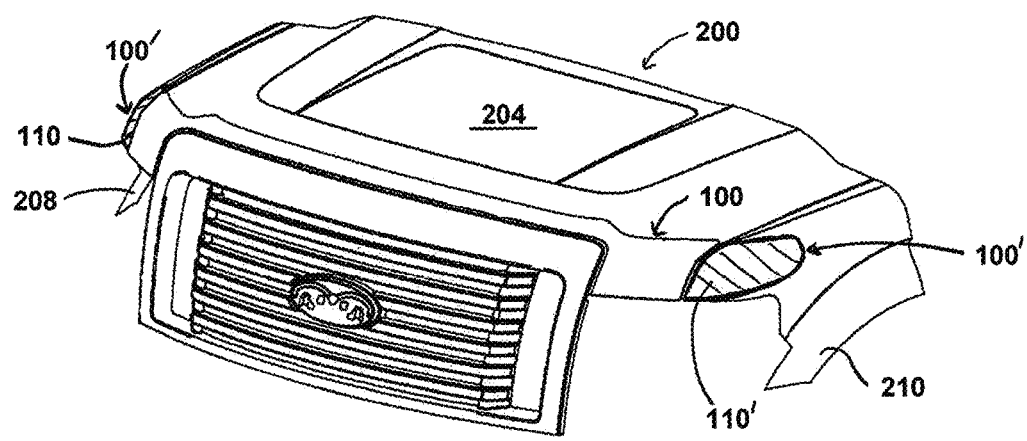
FIG. 18 is a top perspective view of the vehicle shield and vehicle of FIG. 1 showing a schematic view of optional side shields.
Figure 19:
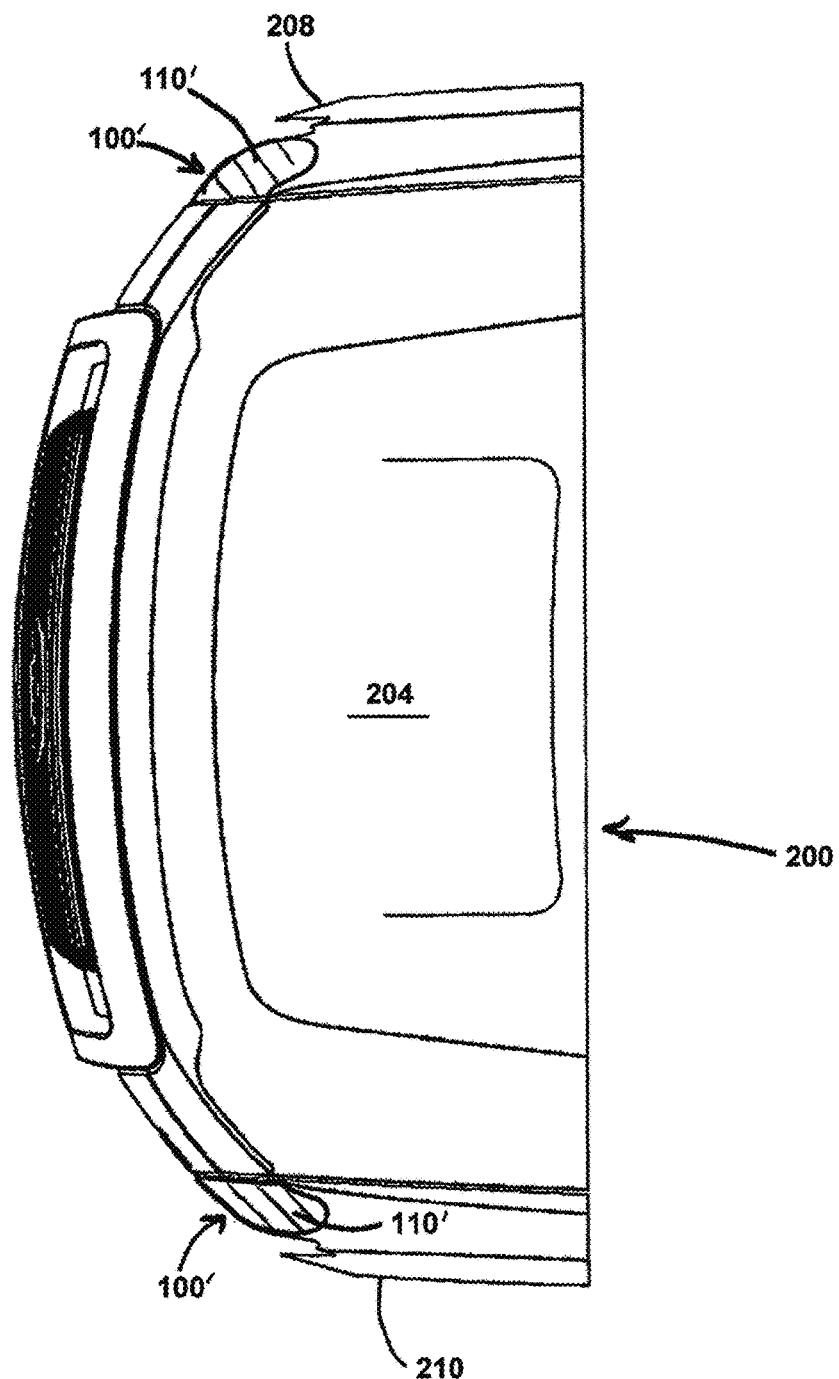
FIG. 19 is a top view of the vehicle shield and vehicle of FIG. 18.
Figure 20:
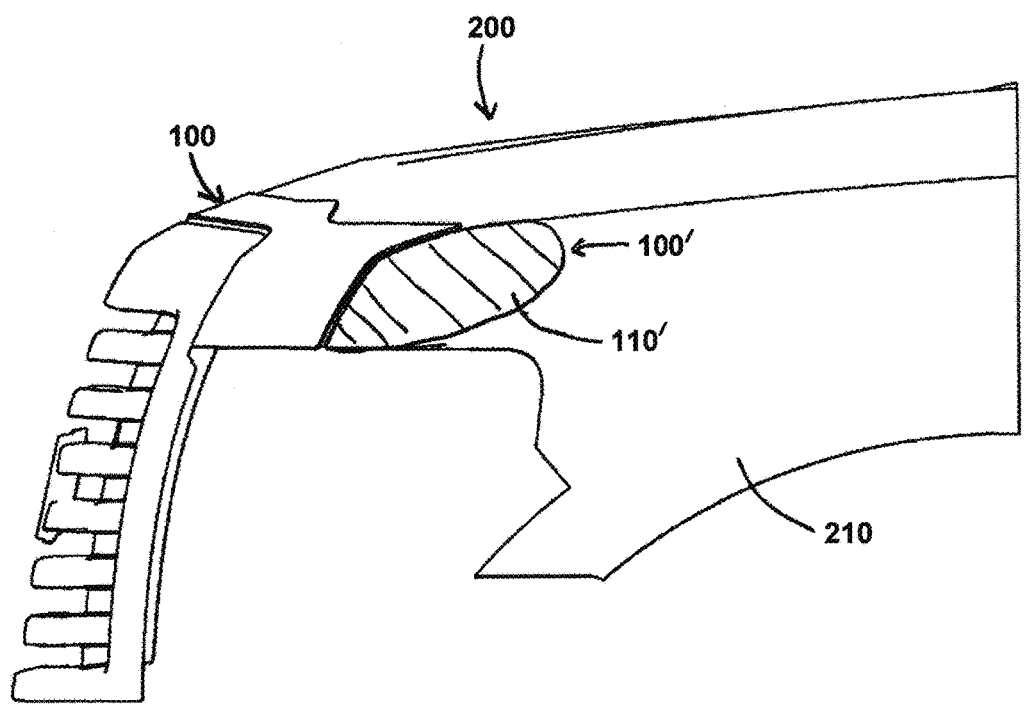
FIG. 20 is a first side view of the vehicle shield and vehicle of FIG. 18.
Figure 21:
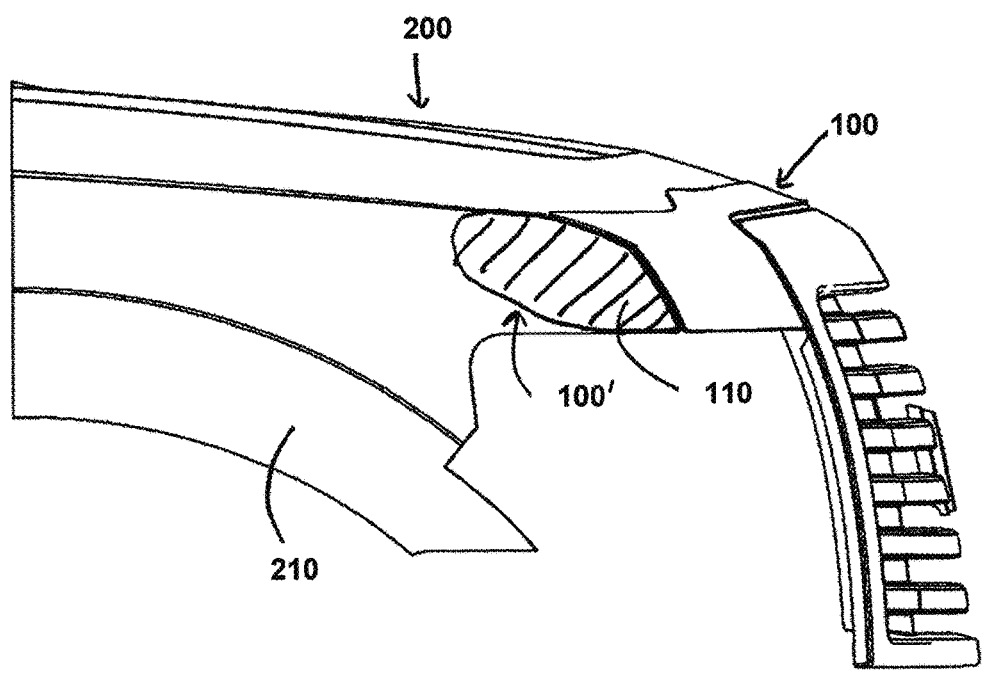
FIG. 21 is a second side view, opposite the first side view of FIG. 20, of the vehicle shield and vehicle of FIG. 18.

A vehicle shield 100 for protecting the exterior surface 202 of a vehicle 200 is disclosed. When a vehicle is driving at a high rate of speed, debris can strike and damage the front end of the vehicle. Those surfaces of the front end of the vehicle 200 that are at an angle to the road are the most vulnerable because the potential impact angle from debris is the greatest. In some cases, this area is the leading edge 204a of the vehicle's hood 204, and in others it is the front fascia 206 of the vehicle 200. The disclosed vehicle shield 100 is designed to protect these areas of the vehicle 200. FIGS. 1-4 and 7-15 show embodiments where the vehicle shield 100 is attached to the hood 204 of the vehicle 200 while FIGS. 16-17 show the vehicle shield 100 attached to the front fascia 206 of the vehicle 200.

Vehicles 200, or portions thereof, to which the vehicle shield 100 are attached are shown at FIGS. 1-4 and 7-17. As noted at FIGS. 1-4, vehicle 200 has an exterior surface 202 that extends across a hood 204, a front fascia 206, a right fender 208, a left fender 210 and a front grille 212. The hood 204 has a leading edge 204a and a contoured surface configuration 204b. Hood 204 also has a first side edge 204c and a second side edge 204d separated by a width, $W_H$. Front fascia 206 also has a contoured surface configuration 206a. In some cases, the front grille 212, the front fascia 206, or the hood 204 may have an emblem 214.

One aspect of vehicle shield 100 is the main body 110. As shown, main body 110 has a length, $L_{MB}$ and an outer periphery 112 defined by a leading edge 112a, a trailing edge 112b, a first side edge 112c and a second side edge 112d. The main body 110 also has side portions 110a near the first and second side edges, 112c and 112d. Length, $L_{MB}$ extends from the first side edge 112c to the second side edge 112d. When attached to a vehicle 200, the leading edge 112a of the main body 110 is the forward most part of the vehicle shield 100. The outer periphery 112 defines a first side comprising a protection surface 120. Protection surface 120 is the portion of vehicle shield 100 that faces away from the vehicle exterior surface 202 so as to protect the exterior surface 202 from damage by debris. Opposite the protection surface 120, and separated by a thickness $T_{MB}$, is a first side comprising an attachment surface 130 to which an attachment system 150, discussed later, is connected. Both the protection surface 120 and the attachment surface 130 can have contour configurations 122, 132, respectively, that are shaped to follow the contoured surface configuration 204b of the hood 204 or the contoured surface configuration 206a of the front fascia 206. As such, the protection surface 120, the attachment surface 130, and the portion of the vehicle 200 exterior 202 to which the vehicle shield 100 is attached, are generally equidistant from each other. In the particular embodiment shown, the protection surface contour configuration 122 and the attachment surface contour configuration 132 are generally equidistant from each other as thickness, $T_{MB}$ is shown as being substantially constant throughout the main body 110. It should be noted that the vehicle shield main body 110 has a pre-molded contoured shape which is in contrast to an article that is simply a planar, thin material that naturally takes the shape of the surface on which it is placed. Additionally, the contoured shape of the main body 110 in many embodiments is generally symmetrical from the leading edge 112a to the trailing edge 112b throughout the majority of the length, $L_{MB}$, of the main body 110. However, nearer to the side edges 112c, 112d, at the side portions 110a of the main body 110, the contoured shape often changes to accommodate the changing contour of the vehicle exterior surface 202. As can be appreciated, the contoured shape of the main body 110 can vary significantly throughout the length, $L_{MB}$ and does not have to result in a constant cross-sectional shape.

Figure 6:
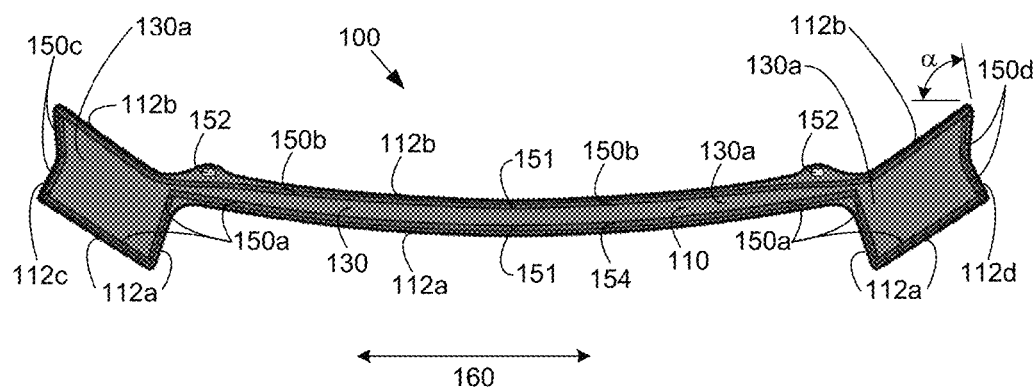
FIG. 6 is a schematic bottom view of the vehicle shield of FIG. 1, showing a first embodiment of an attachment system.

Another aspect of vehicle shield 100, is attachment system 150. As stated previously, the attachment system 150 is for bonding the main body 110 of the vehicle shield 100 to the exterior surface 202 of the vehicle. Many types of attachment systems are suitable for this purpose. In the particular embodiment shown, and as best seen at FIG. 6, attachment system 150 can include first, second, third and fourth adhesive tape sections, 150a, 150b, 150c, and 150d, respectively. Each of the tape sections 150a-d can comprise a single length of tape or multiple lengths of tape. Also, each of the adhesive tape sections has a thickness, $T_{AS}$ and a tape liner 154 for preserving and protecting the adhesiveness of the tape sections up to the point that the vehicle shield 100 is to be installed. Attachment system 150 can also have pads 152, for example rubber pads, disposed on the attachment surface 130 to provide support for the vehicle shield 100 at points where there is no adhesive tape section in order to prevent the hood 204 of the vehicle from becoming scratched.

In the embodiments shown, the first adhesive tape section 150a is arranged proximate the leading edge 112a of the vehicle shield 100 while the second adhesive tape section 150b is arranged proximate to the trailing edge 112b of the vehicle shield 100. The third and fourth adhesive tape sections, 150c and 150d, are shown as being proximate to the first and second side edges 112c, 112d, respectively. Thus, in the arrangement shown, the majority of the attachment surface 130, and the entire central portion 130a of the attachment surface 130 is not covered by the adhesive tape sections. However, one skilled in the art will appreciate that more or fewer adhesive tape sections may be used in various arrangements. One notable feature of attachment system 150 is that tape sections 150a and 150b are each oriented to define a channel or cut 151 at about the midpoint of main body 110. Cut 151 can be formed by cutting away tape section lengths or by leaving a gap between tape section lengths. Cut 151 allows for moisture that may have gathered along the tape sections 150a, 150b to drain away from the main body 110. In the particular embodiment shown, channel 151 is about 0.25 inch. Additionally, between the individual tape lengths of the tape sections allow for moisture vapor to escape and thereby help to prevent undesirable condensation from forming on the attachment surface 130 of the main body 110.

Figure 6A:
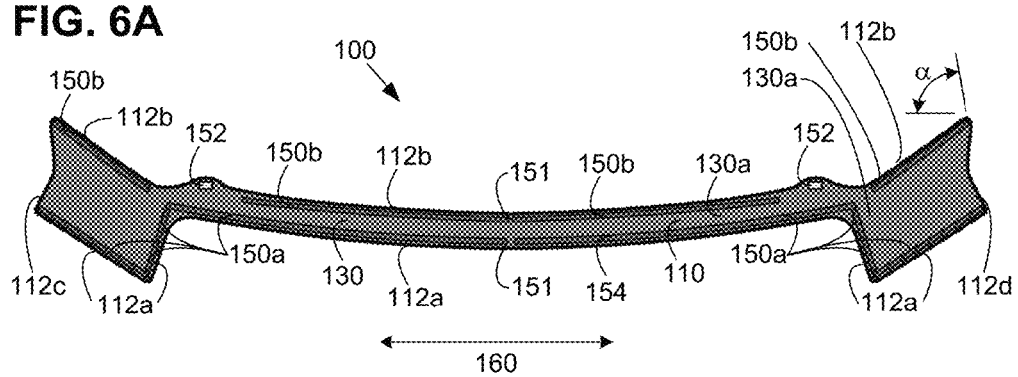
FIG. 6a is a schematic bottom view of the vehicle shield of FIG. 1 showing a second embodiment of an attachment system.

In a preferred embodiment, adhesive tape sections 150c and 150d are not used, as shown in FIG. 6a. FIG. 6a shows an alternative configuration for attachments system 150 wherein the first and second side edges 112c, d of the main body 110 contain no adhesive tape sections extending along the first and second edges 112c, 112d between the first and second adhesive tape sections. In some embodiments, it has been discovered that attachment system 150 provides better adhesion performance through multiple thermal expansion/contraction cycles when tape sections at the ends 112a, 112b of the main body 110 are not used. In general, main body 110 will expand and contract a greater distance from end 112c to end 112d in direction 160, as compared to expansion occurring in a direction from the leading edge 112a to the trailing edge 112b. Direction 160 is also the general lengthwise direction of the main body 110 and parallel to length $L_{MB}$. As a consequence of thermal expansion, main body 110 exerts a force upon the adhesive tape sections of the attachment system 150 along direction 160. This force can cause adhesive tape sections to become detached from the hood 204. Adhesive tape sections extending from the leading edge 112a to the trailing edge 112b and located at the ends 112c, 112d of the main body 110 are especially prone to detachment due to the fact that they are oriented generally perpendicular to the direction of force 160. By use of the term "generally perpendicular," it is meant to include orientations that are greater than 45 degrees from the direction of force 160. As shown in FIGS. 6 and 6A, ends 112c, 112d are about 80 degrees from direction 160 as represented by angle α. In some embodiments, where adhesive tape sections at the ends 112c, 112d have sufficient strength to remain attached, the main body 110 can buckle during thermal expansion as the adhesive tape sections can physically prevent the ends from moving when the rest of the main body 110 is expanding. As such, it can be beneficial to configure attachment system 150 such that ends 112c and 112d of the main body 110 are free from generally perpendicular adhesive tape sections. It is noted that the particular embodiments shown in FIGS. 6 and 6A does have some tape sections 150a at the leading edge 112a that are generally perpendicular to the lengthwise direction of the main body 110. While these tape sections could be removed for greater thermal expansion performance, it has been found that the overall adhesive performance is enhanced as the main body 110 must be secured to the hood 204 as the main body wraps around the front grill 212. Additionally, thermal expansion is not as severe of an issue as is present at the ends 112c, 112d of the main body 110. It is also noted that these generally perpendicular tape sections are shown on the outermost portions of the main body 110 for a distance from the ends 112c, 112d at least equal to or greater than the distance between the leading and trailing edges of the main body 110.

Figure 1:
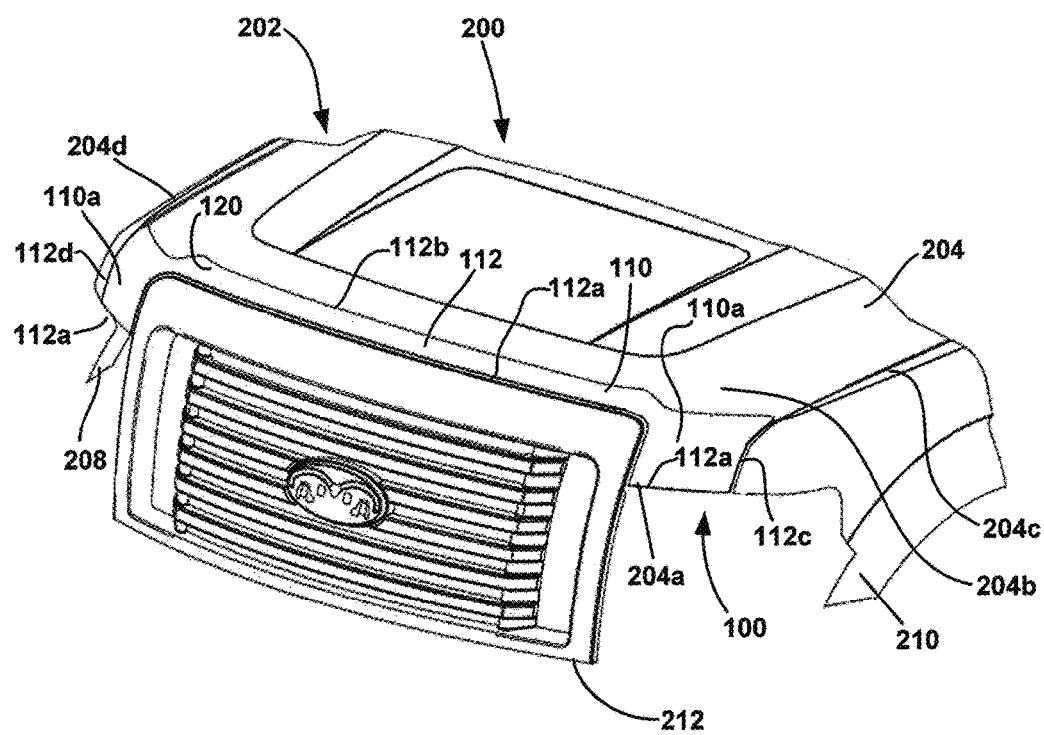
FIG. 1 is a top perspective view of a first embodiment of a vehicle shield mounted on a vehicle.
Figure 2:
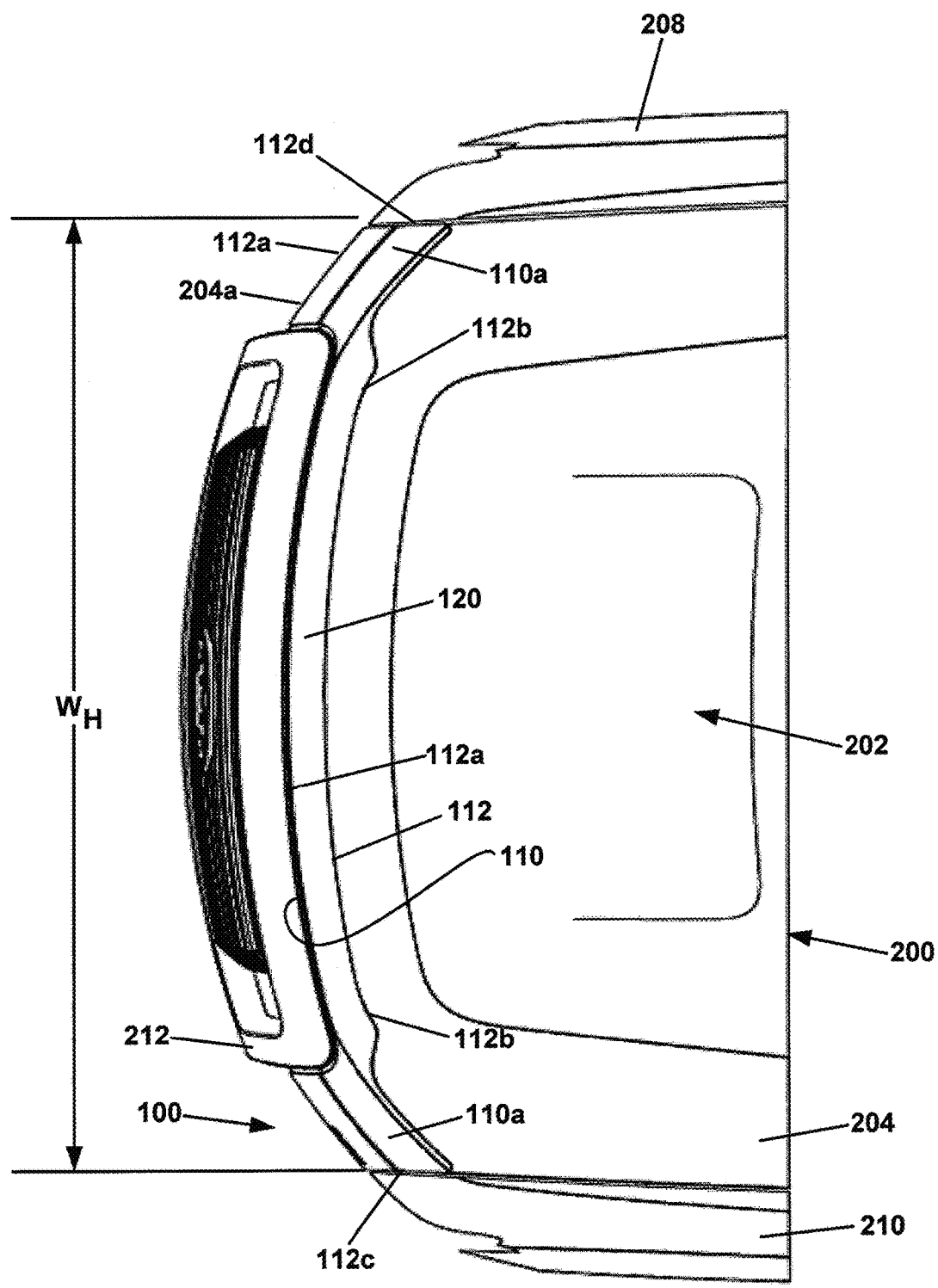
FIG. 2 is a top view of the vehicle shield and vehicle of FIG. 1.
Figure 3:
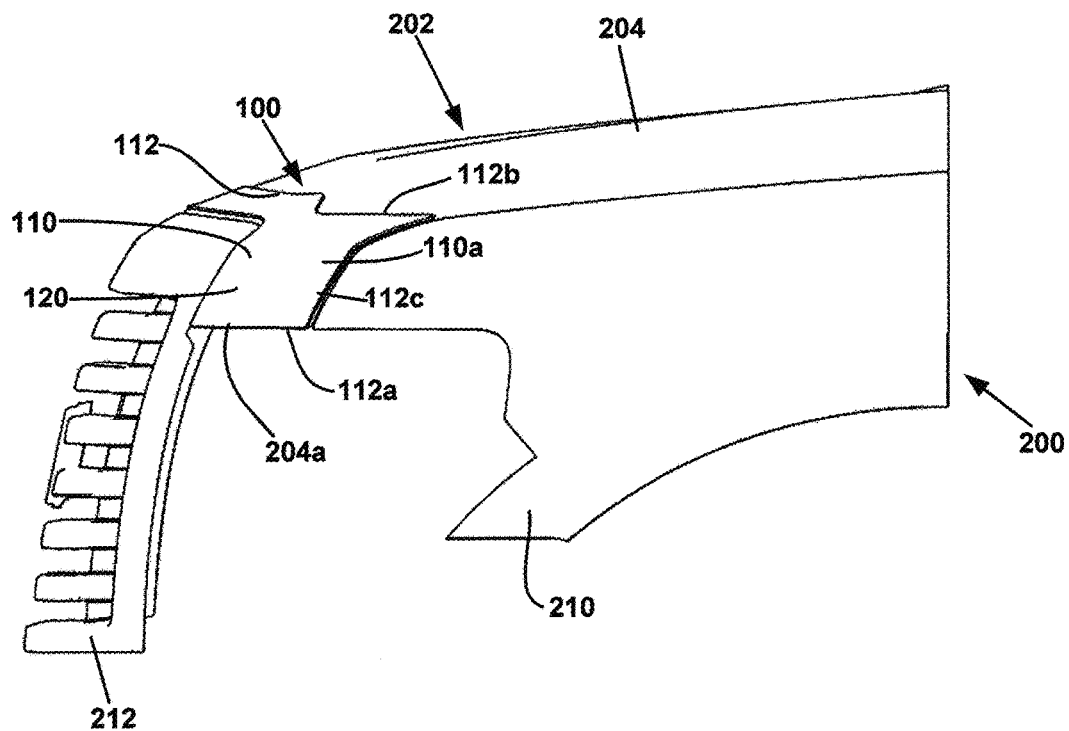
FIG. 3 is a first side view of the vehicle shield and vehicle of FIG. 1.
Figure 4:
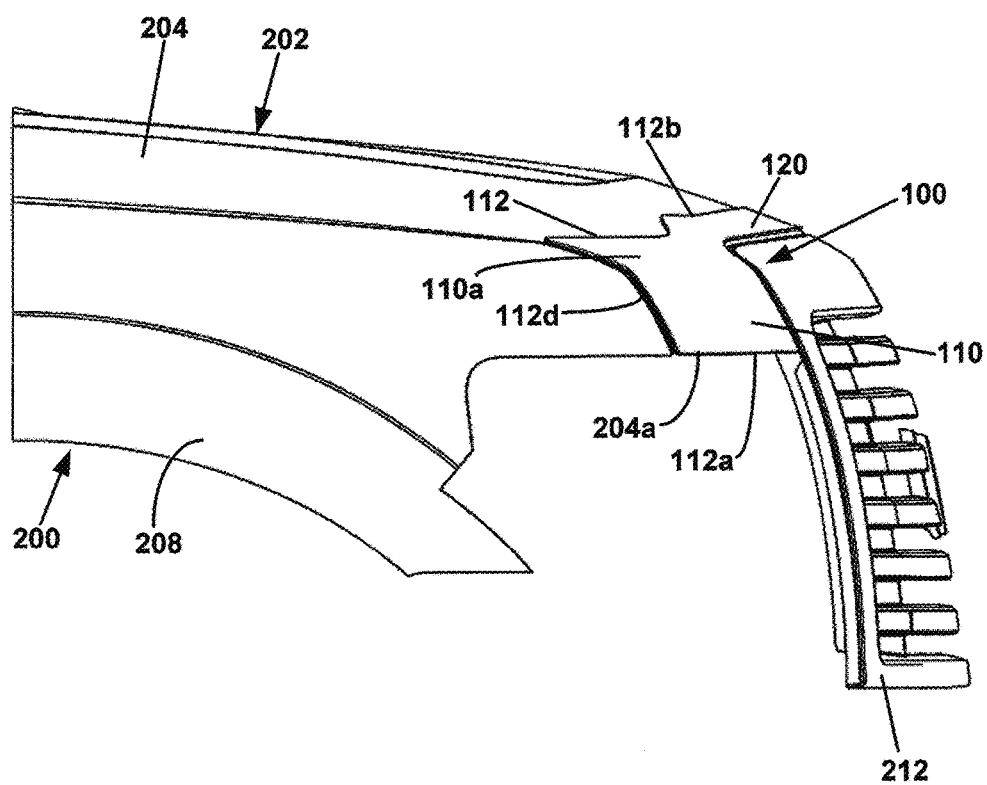
FIG. 4 is a second side view, opposite the first side view of FIG. 3, of the vehicle shield and vehicle of FIG. 1.
Figure 5:
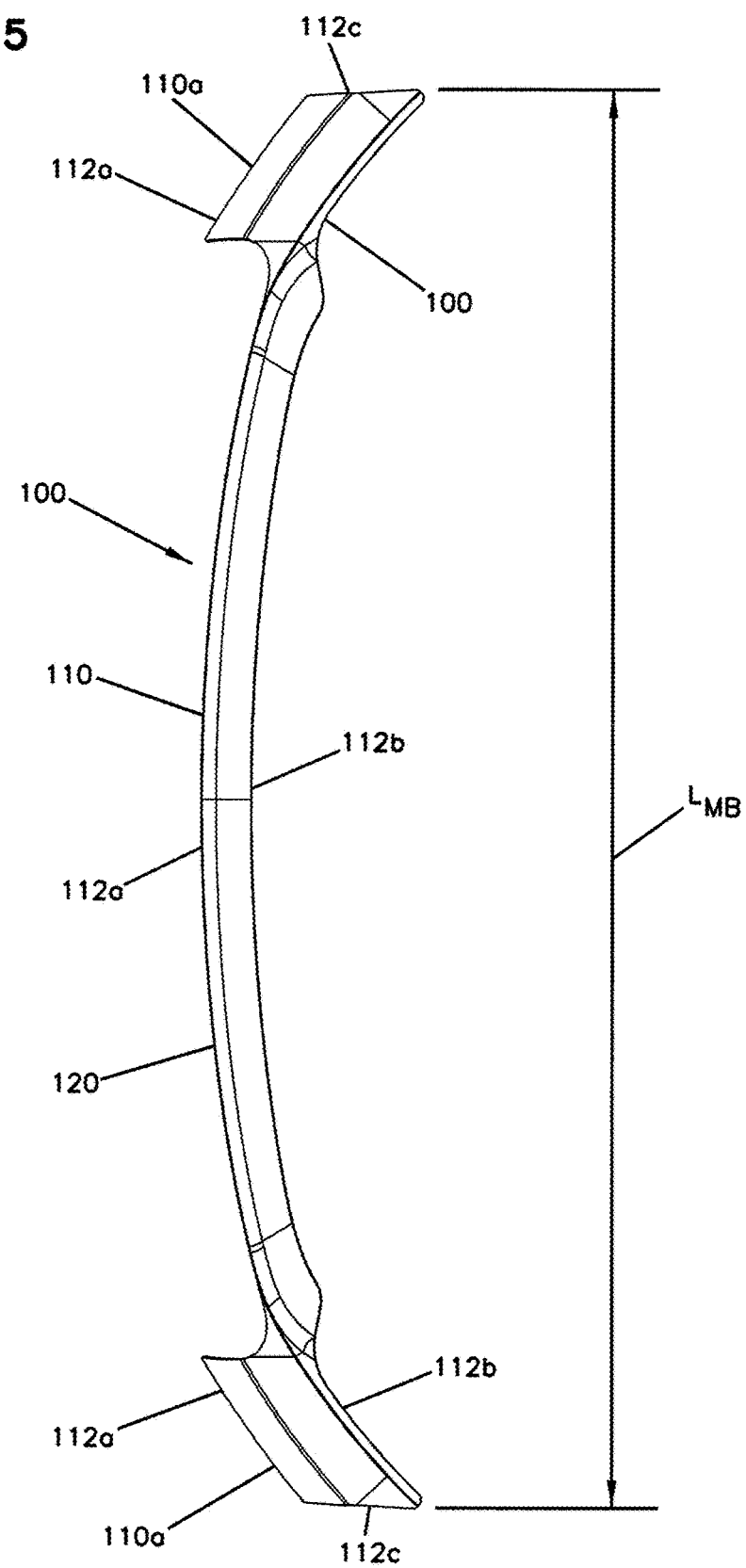
FIG. 5 is a schematic top view of a generic vehicle shield before being mounted onto a vehicle.

FIG. 6A also shows a preferred arrangement of tape sections 150b along the trailing edge 112b of the main body 110. Instead of using a continuous length of tape from cut 150 to the ends 112c, 112d, FIG. 6A shows two separate lengths 150b on each side and separated from pads 152. As can be seen at FIG. 1, the main body 110 has an aggressively shaped contour with highly radiused curves at the general location of pads 152. In locations such as these, the tape sections can have difficulty following the contours while still maintaining good adhesion performance. As such, using multiple tape sections 150b in these areas, in conjunction with pads 152, can result in better adhesion performance while ensuring that hood 214 remains protected from the main body 110. FIG. 6A also shows a preferred arrangement of multiple lengths of tape sections 150a used for the generally perpendicular lengths that wrap downwardly along the front grill 212 of the hood. It has been found that using multiple sections in areas typical of this provide enhanced adhesion performance.

The particular adhesive used in the embodiments shown is a double-sided automotive grade foam core acrylic tape from the 3M Corporation (model 5390). The tape shown is approximately 2 millimeters thick and 8 millimeters wide, although other thicknesses and widths may be used. For example, the tape sections could be less than 1 millimeter thick and up to 5 millimeters, or more thick. The width could also be less than 1 millimeter wide and up to the width of the main body 110, depending on the configurations of the tape sections. Through the use of attachment system 150, it should be appreciated that vehicle shield 100 can be configured such that no part of the main body 110 of the vehicle shield 100 comes into contact with the exterior surface 202 of the vehicle 200.

Figure 7:
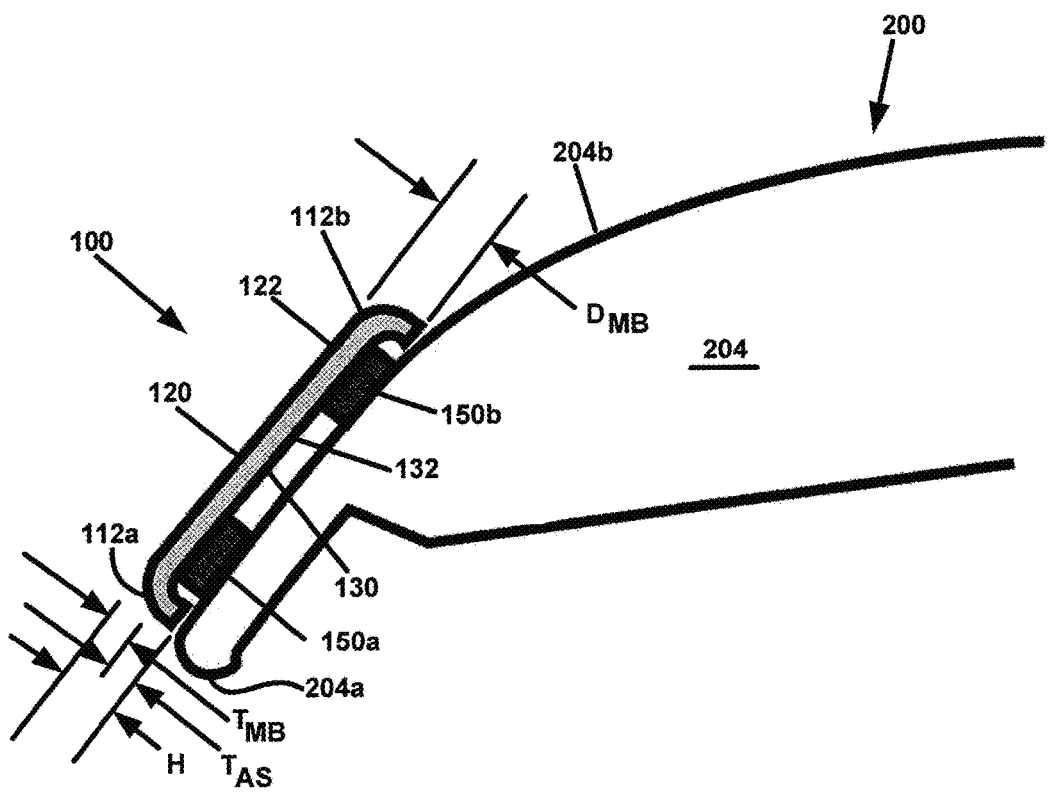
FIG. 7 is a schematic cross-sectional view of a generic vehicle shield.
Figure 8:
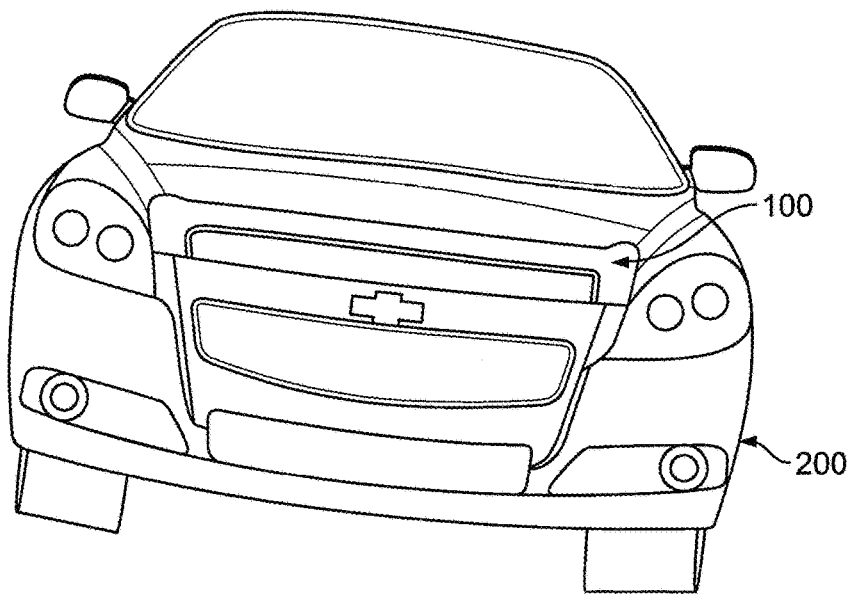
FIG. 8 is a perspective view of a second embodiment of a vehicle shield mounted on a vehicle.

As can be best seen at FIG. 7, the leading edge 112a, the trailing edge 112b, the first side edge 112c and the second side edge 112d of the vehicle shield 100 can be rolled downwards towards the attachment surface 130 to define a lip having an edge depth, $D_{MB}$. As shown, the lip extends towards the vehicle surface 202 beyond the plain of the attachment surface 130 and can be formed by a variety of methods. For example, the lip can be formed during the thermoforming process and optionally further trimmed after thermoforming. The lip can also be separately formed after the thermoforming process for the main body 110. Instead of rolling or thermoforming the edges, edge depth, $D_{MB}$, can also be created through the use of an extruded seal around the outer periphery 112. However created, the lip having edge depth, $D_{MB}$, aids in concealing the attachment system 150 from view once the vehicle shield 100 has been installed on the vehicle 200. Furthermore, edge depth, $D_{MB}$, increases the aerodynamic properties of the vehicle shield 100 by directing airflow over the protection surface 120.

Once the vehicle shield 100 has been installed, the protection surface 120 is located at a stand off height, H, above the exterior surface 202 of the vehicle 200. As can be seen at FIG. 7, stand off height, H, is approximately the sum of the adhesive tape section thickness, $T_{AS}$ and the main body thickness, $T_{MB}$. In the case that the main body 110 edges are rolled, edge depth, $D_{MB}$, will be slightly less than the height, H, such that the adhesive tape sections project away from the attachment surface 130 sufficiently to reach the hood 204 or front fascia 206 of the vehicle 200. Or stated another way, the minimum thickness of the adhesive tape sections, $T_{AS}$, is at least the same or exceeds the edge depth, $D_{MB}$. Because the vehicle shield has a contoured shape 122, 132, that follows the contoured shape of the vehicle hood 204 or the front fascia 206, the stand off height, H, is relatively constant across the main body 110. In some embodiments, this configuration will result in the stand off height, H, at any point along the main body as being less than 0.25 inches. Because of this low stand off height, it should be appreciated that substantial protection to the hood 204 or front fascia 206 can be obtained with minimal impact on the aerodynamics of the vehicle, while also achieving improved vehicle aesthetics with the disclosed low profile design of the vehicle shield 100. Furthermore, it should also be appreciated that the aerodynamic low profile design of vehicle shield 100 will reduce the likelihood of excessive hood flutter while driving at high speeds.

Figure 9:
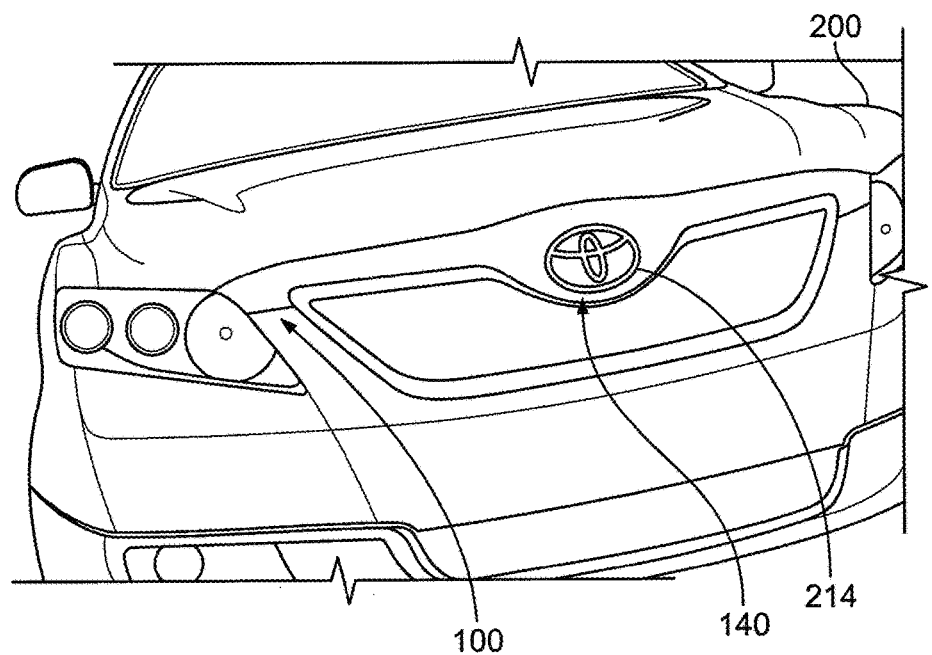
FIG. 9 is a perspective view of a third embodiment of a vehicle shield mounted on a vehicle.
Figure 10:
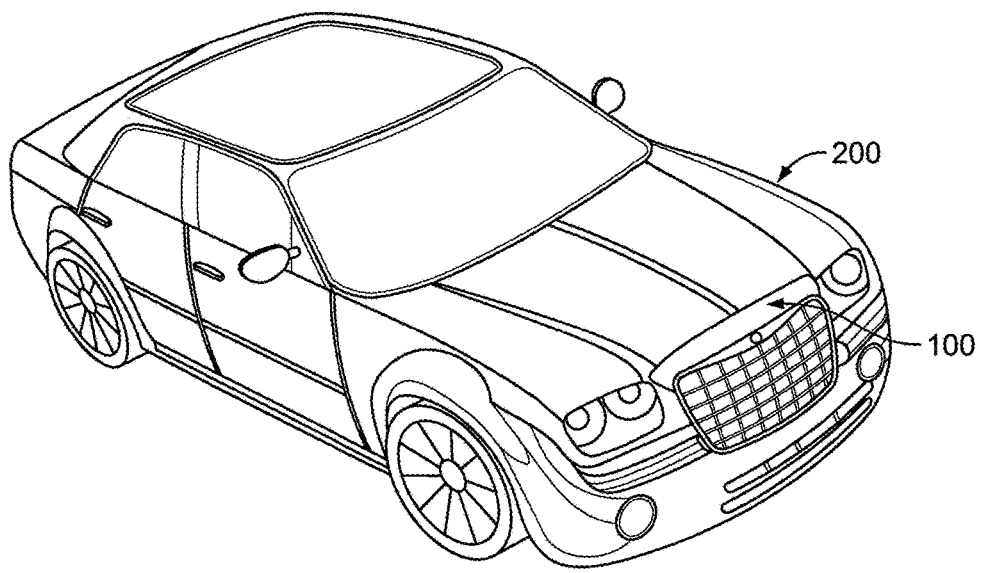
FIG. 10 is a perspective view of a fourth embodiment of a vehicle shield mounted on a vehicle.
Figure 11:
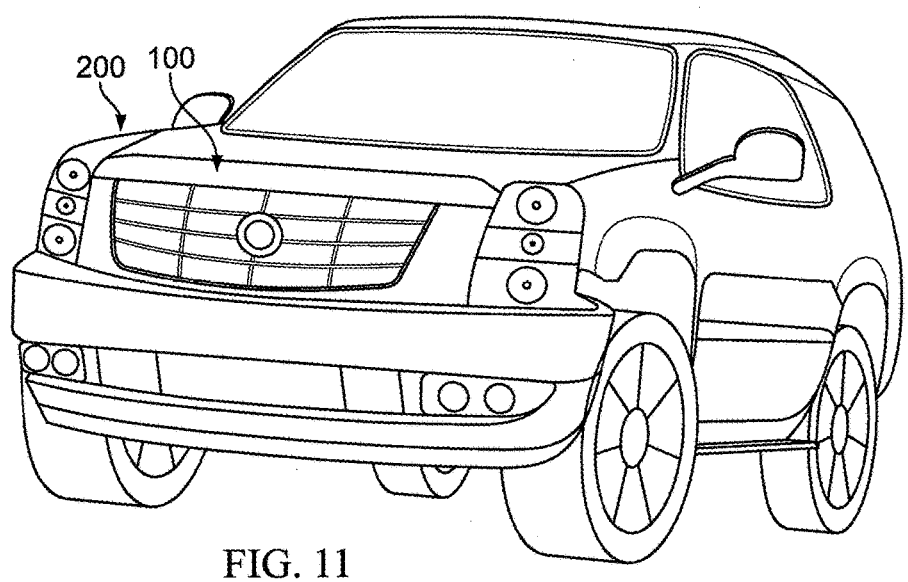
FIG. 11 is a perspective view of a fifth embodiment of a vehicle shield mounted on a vehicle.
Figure 12:
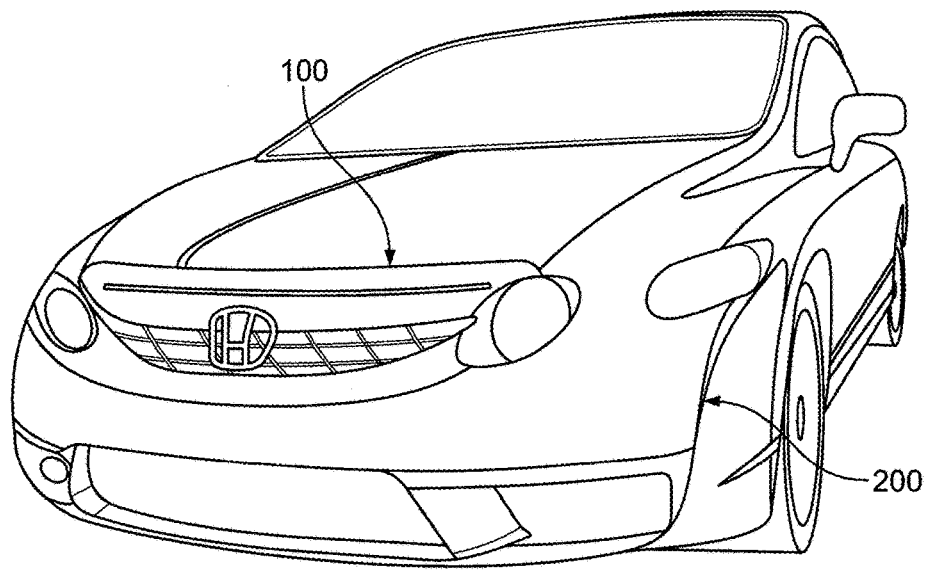
FIG. 12 is a perspective view of a sixth embodiment of a vehicle shield mounted on a vehicle.
Figure 13:
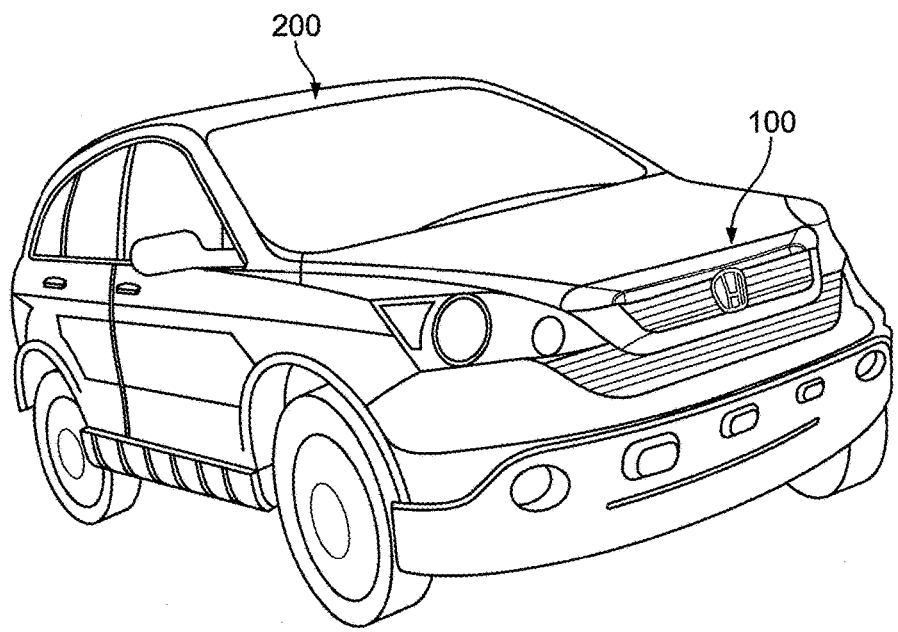
FIG. 13 is a perspective view of a seventh embodiment of a vehicle shield mounted on a vehicle.
Figure 14:
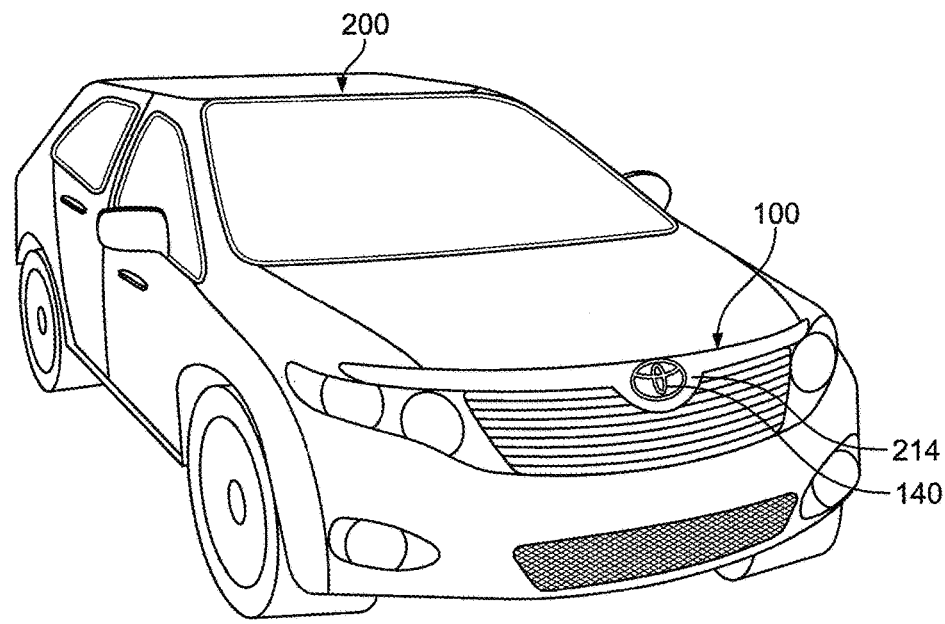
FIG. 14 is a perspective view of an eighth embodiment of a vehicle shield mounted on a vehicle.
Figure 15:
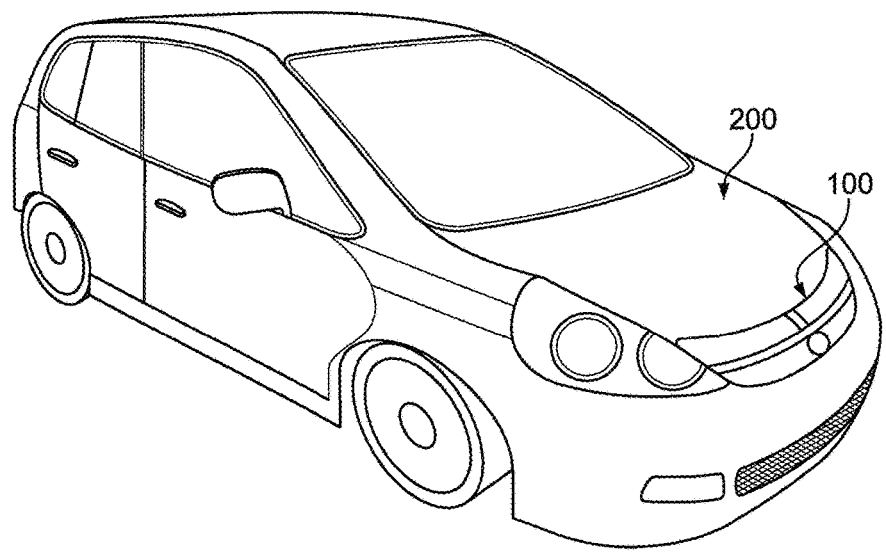
FIG. 15 is a perspective view of a ninth embodiment of a vehicle shield mounted on a vehicle.

As stated previously, the main body 110 has a length, $L_{MB}$. In the case where the vehicle shield 100 is mounted to the hood 204 of a vehicle 206, the main body length, $L_{MB}$ can be sized to substantially match the leading edge width, $W_H$, of the hood which is defined by the front side edges of the hood. However, it should be understood that the main body 110 can be slightly inset from the side edges of the hood to ensure proper clearances. In most embodiments, the length of the main body is at least as long as a majority of a width of a leading edge of the vehicle hood for which the vehicle shield is adapted. Additionally, the leading edge 112a of the main body 110 can have an edge profile that matches the edge profile of the leading edge 204a of the hood 204. By use of the term "edge profile" it is intended to mean the outline of the hood or main body leading edge when viewed from a top perspective. In the event that the vehicle 200 has an emblem 214 that may interfere with the installation of the vehicle shield 100, an aperture 214 can be provided in the main body 110 for the emblem 214, as shown in FIGS. 9 and 14. Where the main body 110 is attached to the front fascia 206 of a vehicle 200, the length, $L_{MB}$, of the main body 110 can be formed as desired to ensure proper protection and aesthetic appearance. In the embodiments shown at FIGS. 16-17, vehicle shield 100 is installed on the front fascia 206 between the leading edge of the hood 204a and the front grille 212 and has a length, $L_{MB}$, that is greater than the leading edge width of the hood, $W_H$.

To install the vehicle shield 100, the above described vehicle shield 100 is positioned over the exterior surface 202 of the vehicle 200. The vehicle shield is then aligned with the appropriate structure on the vehicle 200, for example the leading edge 204a and the side edges 204c, 204d of the hood 204. Once aligned, the adhesive tape liner 154 is removed from the adhesive tape sections, 150a-150d. Subsequently, pressure is applied to the protection surface 120 of the main body 110 in the direction of the attachment surface 130 such that the adhesive tape sections, 150a-150d, fully engage the exterior surface 202 of the vehicle 200. Once the vehicle shield 100 has been installed, a protective film covering that is shipped on the protective surface can be removed. One skilled in the art will appreciate that no tools are required for such an installation, and that no part of the vehicle shield 100 extends below the hood 204, or any other part of the vehicle in order to ensure a secure connection to the vehicle 200. Furthermore, it should be appreciated that this type of vehicle shield can be installed on any type of vehicle, even those which are not able to accept a traditional vehicle shield requiring clips or fasteners.

With reference to FIGS. 18-21, vehicle shield 100 can be complimented through the use of side shields 100'. As shown, side shields 100' are mounted to the vehicle 200 on each side of the vehicle shield 100 at fenders 210 and 208. This arrangement provides the appearance of a continuous shield that extends beyond the width, $W_H$, of the hood 204. Similarly to the vehicle shield 100, side shields 100' have a main body 110' and an attachment system 150'. Furthermore, as side shields 100' are constructed similarly to the vehicle shield 100, the foregoing description of the vehicle shield 100 is incorporated into its entirety for the side shields 100'.

The main body 110 of shield 100 and the main body 110' of the side shields 100' may be made from a variety of materials, such as acrylic, ABS plastic, or other suitable materials. However, one skilled in the art will appreciate that other materials may be used without departing from the concepts presented herein. These materials allow for the main body 110, 110' to be permanently molded into virtually any contoured shape that will complement the contoured shape of a vehicle hood 204, the front fascia 206, or the fenders 208, 210. Typical thicknesses for the main body 110 materials are 0.085 inch and 0.1 inch. The thickness of the material can be less than 0.085 inch, such as 0.05 inch and can be more than 0.1 inch, such as 0.15 inch or 0.25 inch. These thicknesses give the main body 110, 110' sufficient structural integrity to retain their molded contour and shape, once formed. The protection surface can also be given a smoke appearance or have a chrome or painted finish. In the case of chrome or painted finishes, this can be accomplished through the application of a film onto the protection surface 120, 120'. In the particular embodiments shown at FIGS. 8 and 10-12, the protection surface 120 has a chrome finish. In the embodiments shown at FIGS. 9 and 13-17, the protection surface has a smoke appearance.

The above specification, examples and data provide a complete description of the manufacture and use of the composition of the invention. Since many embodiments of the invention can be made without departing from the spirit and scope of the invention, the invention resides in the claims hereinafter appended.

We claim:

1. A vehicle shield for protecting a vehicle hood, the vehicle shield comprising:
    (a) a main body configured for attachment to the vehicle hood, the main body comprising:
        (i) a leading edge, a trailing edge, a first side edge, a second side edge, and a length wherein the length extends from the first side edge to the second side edge;
        (ii) a first side comprising a protection surface that extends between the leading, trailing, and side edges of the main body;
        (iii) a second side opposite the first side, the second side comprising an attachment surface;
        (iv) the main body being molded such that the protection and attachment surfaces have a contour configuration arranged to follow an exterior surface contour configuration of the vehicle; and
        (v) the main body including a lip extending along the leading edge and constructed to wrap toward the vehicle hood when the vehicle shield is installed on the vehicle hood;
    (b) an attachment system comprising:
        (i) an adhesive tape section connected to the attachment surface for holding down the leading edge of the vehicle shield.

2. The vehicle shield of claim 1, wherein:
    (a) the adhesive tape section connected to the attachment surface is proximate the leading edge of the vehicle shield main body.

3. The vehicle shield of claim 1, wherein the vehicle shield main body has a substantially uniform material thickness that is from about 0.05 inch to about 0.15 inch.

4. The vehicle shield of claim 1, wherein the main body is provided with an aperture for exposing a vehicle logo.

5. A motor vehicle having a front fascia and a vehicle shield comprising:
    (a) a main body having lengthwise direction and configured for attachment to a vehicle having a hood, the main body comprising:
        (i) a leading edge, a trailing edge, a first side edge, a second side edge, and a length wherein the length extends from the first side edge to the second side edge;

(ii) a first side comprising a protection surface facing away from the front fascia that extends between the leading, trailing and side edges of the main body;
(iii) a second side comprising an attachment surface facing towards the front fascia;
(iv) the main body being molded such that the protection and attachment surfaces have a contour configuration arranged to follow an exterior surface contour configuration of a vehicle; and
(v) the main body including a lip extending along the leading edge and constructed to wrap toward the vehicle front fascia when the vehicle shield is installed on the front fascia;
(b) an attachment system comprising an adhesive tape section connected to the attachment surface for holding down the leading edge of the vehicle shield;
(c) wherein the attachment system connects the vehicle shield main body to the front fascia.

6. The motor vehicle of claim 5, wherein no part of the vehicle shield is attached to an underside of the vehicle.

7. The motor vehicle of claim 5, wherein the length of the main body of the vehicle shield generally matches a width of a vehicle hood.

8. The motor vehicle of claim 5, wherein:
(a) the adhesive tape section connected to the attachment surface is proximate the leading edge of the vehicle shield main body.

9. The motor vehicle of claim 5, wherein the vehicle shield main body has a substantially uniform material thickness that is between 0.05 inch and 0.15 inch.

10. The motor vehicle of claim 5, wherein the vehicle shield main body is formed from an acrylic material.

11. The motor vehicle of claim 5, wherein the vehicle shield main body has a chrome film coating.

12. The motor vehicle of claim 5, wherein the vehicle shield main body has a painted film coating.

13. The motor vehicle of claim 5, wherein the vehicle shield main body is provided with an aperture for exposing a vehicle logo.

14. The motor vehicle of claim 5, wherein no part of the protection surface is no more than 0.25 inch above the exterior surface of the vehicle.

* * * * *